United States Patent
Beck et al.

(10) Patent No.: US 11,413,970 B2
(45) Date of Patent: Aug. 16, 2022

(54) SYSTEM AND METHOD FOR IMPROVING TRACTION OF A VEHICLE THAT INCLUDES TWO ELECTRIC MACHINES

(71) Applicant: Ford Global Technologies, LLC, Dearborn, MI (US)

(72) Inventors: David Beck, Ann Arbor, MI (US); Walter Joseph Ortmann, Saline, MI (US); Matthew Erich von der Lippe, Canton, MI (US); Kevin Higgins, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 16/547,203

(22) Filed: Aug. 21, 2019

(65) Prior Publication Data

US 2021/0053448 A1 Feb. 25, 2021

(51) Int. Cl.
*B60L 15/20* (2006.01)
*B60K 17/356* (2006.01)
*B60W 50/00* (2006.01)

(52) U.S. Cl.
CPC ........ *B60L 15/2009* (2013.01); *B60K 17/356* (2013.01); *B60W 50/00* (2013.01); *B60L 2240/465* (2013.01); *B60L 2260/28* (2013.01); *B60W 2050/0056* (2013.01); *B60W 2520/26* (2013.01); *B60W 2710/18* (2013.01); *B60Y 2200/91* (2013.01); *B60Y 2300/18108* (2013.01); *B60Y 2300/18175* (2013.01); *B60Y 2400/82* (2013.01)

(58) Field of Classification Search
CPC ............ B60L 15/2009; B60L 2260/28; B60L 2240/465; B60L 2240/26; B60L 7/26; B60L 7/18; B60K 17/356; B60W 50/00; B60W 2050/0056; B60W 2710/18; B60W 2520/26; B60Y 2300/18175; B60Y 2200/91; B60Y 2400/82; B60Y 2300/18108; B60T 2240/06; B60T 8/1766
See application file for complete search history.

(56) References Cited

U.S. PATENT DOCUMENTS

| | | | |
|---|---|---|---|
| 4,677,557 A * | 6/1987 | Stumpe | B60T 8/266 303/9.69 |
| 5,646,848 A * | 7/1997 | Walenty | B60T 8/1725 303/155 |
| 5,938,295 A * | 8/1999 | Stumpe | B60T 8/1766 303/9.69 |
| 6,457,784 B1 * | 10/2002 | Bohm | B60L 7/26 303/155 |
| 6,921,100 B2 | 7/2005 | Mantini et al. | |
| 9,242,565 B2 | 1/2016 | Kleickmann et al. | |
| 9,981,649 B2 * | 5/2018 | Crombez | B60T 1/10 |
| 2004/0238244 A1 * | 12/2004 | Amanuma | B60W 10/08 180/65.225 |

(Continued)

*Primary Examiner* — James M McPherson
*Assistant Examiner* — Kyle J Kingsland
(74) *Attorney, Agent, or Firm* — David Kelley; McCoy Russell LLP

(57) ABSTRACT

Methods and system are provided for generating regenerative braking torque at a front axle and a rear axle of a vehicle. In one example, the regenerative braking torque may be a function of a normal load applied to the front axle and a normal load applied to the rear axle.

15 Claims, 8 Drawing Sheets

(56) References Cited

U.S. PATENT DOCUMENTS

| | | | |
|---|---|---|---|
| 2005/0222740 A1* | 10/2005 | Inoue | B60T 8/171 |
| | | | 701/70 |
| 2010/0292882 A1 | 11/2010 | Murata | |
| 2019/0111790 A1* | 4/2019 | Crombez | B60L 7/26 |
| 2019/0217709 A1 | 7/2019 | Zhao et al. | |
| 2020/0189398 A1* | 6/2020 | Suzuki | B60W 10/08 |
| 2020/0393287 A1* | 12/2020 | Davis | G01G 19/08 |

* cited by examiner

SYSTEM AND METHOD FOR IMPROVING TRACTION OF A VEHICLE THAT INCLUDES TWO ELECTRIC MACHINES

FIELD

The present description relates generally to methods and systems for improving traction of an electric vehicle. The electric vehicle may include electric machines that may provide power to a front axle and a rear axle.

BACKGROUND/SUMMARY

A vehicle may be stopped via friction brakes. The friction brakes may be biased via a proportioning valve to provide a greater braking force to the vehicle's front wheels as compared to the vehicle's rear wheels. The proportion of braking force that is allocated to the vehicle's front wheels does not change relative to the proportion of braking force that is allocated to the vehicle's rear wheels even though vehicle operating conditions may change from time to time.

Hybrid vehicles and electric vehicles may provide regenerative braking via an electric machine that slows the vehicle by converting the vehicle's kinetic energy into electric energy. The electric machine may provide regenerative braking below a threshold vehicle deceleration rate and friction brakes may be engaged once the vehicle deceleration rate exceeds the threshold vehicle deceleration rate. The amount of friction braking may depend on whether the vehicle is a front wheel drive vehicle or a rear wheel drive vehicle. In addition, the amount of regenerative braking may be limited so that the front to rear traction balance may be maintained closer to a desired level. Consequently, the regenerative braking may not be optimized.

The inventors herein have recognized the above-mentioned issues and have developed a method for braking a vehicle, comprising: adjusting an amount of braking torque applied to a front axle via a first electric machine and adjusting an amount of braking torque applied to a rear axle via a second electric machine according to an output of a sensor that is indicative of front axle normal load and output of a sensor that is indicative or rear axle normal load in response to a braking request.

By adjusting a braking torque that is applied to a front axle and a braking torque that is applied to a rear axle according to an output of a front sensor and an output of a rear sensor, it may be possible to provide the technical result of improved regenerative braking. In particular, the front and rear sensors may be sensors that provide an indication of normal loads that are applied to the vehicle's front and rear axles so that a change in vehicle mass or a change in suspension orientation may be compensated. The compensation may improve a front axle to rear axle braking torque split so that regenerative braking may be optimized. Further, the front axle to rear axle braking torque split may be dynamically changed further improving regenerative braking efficiency.

The present description may provide several advantages. In particular, the approach provides a regenerative braking that is adjusted as a function of normal loads that are applied to front and rear axles to improve regenerative braking efficiency. Specifically, regenerative braking torque that is applied to a front axle is adjusted responsive to a suspension height sensor that measures front suspension height. Regenerative braking torque that is applied to a rear axle is adjusted responsive to a suspension height sensor that measures rear suspension height. Further, the approach may dynamically compensate for changes in orientation of a vehicle's suspension that may affect a normal load that is applied to an axle. Further still, the approach may adjust a relationship between vehicle height sensor output and normal force that is applied to an axle so that the estimate of the normal force that is applied to the axle may be estimated more precisely.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
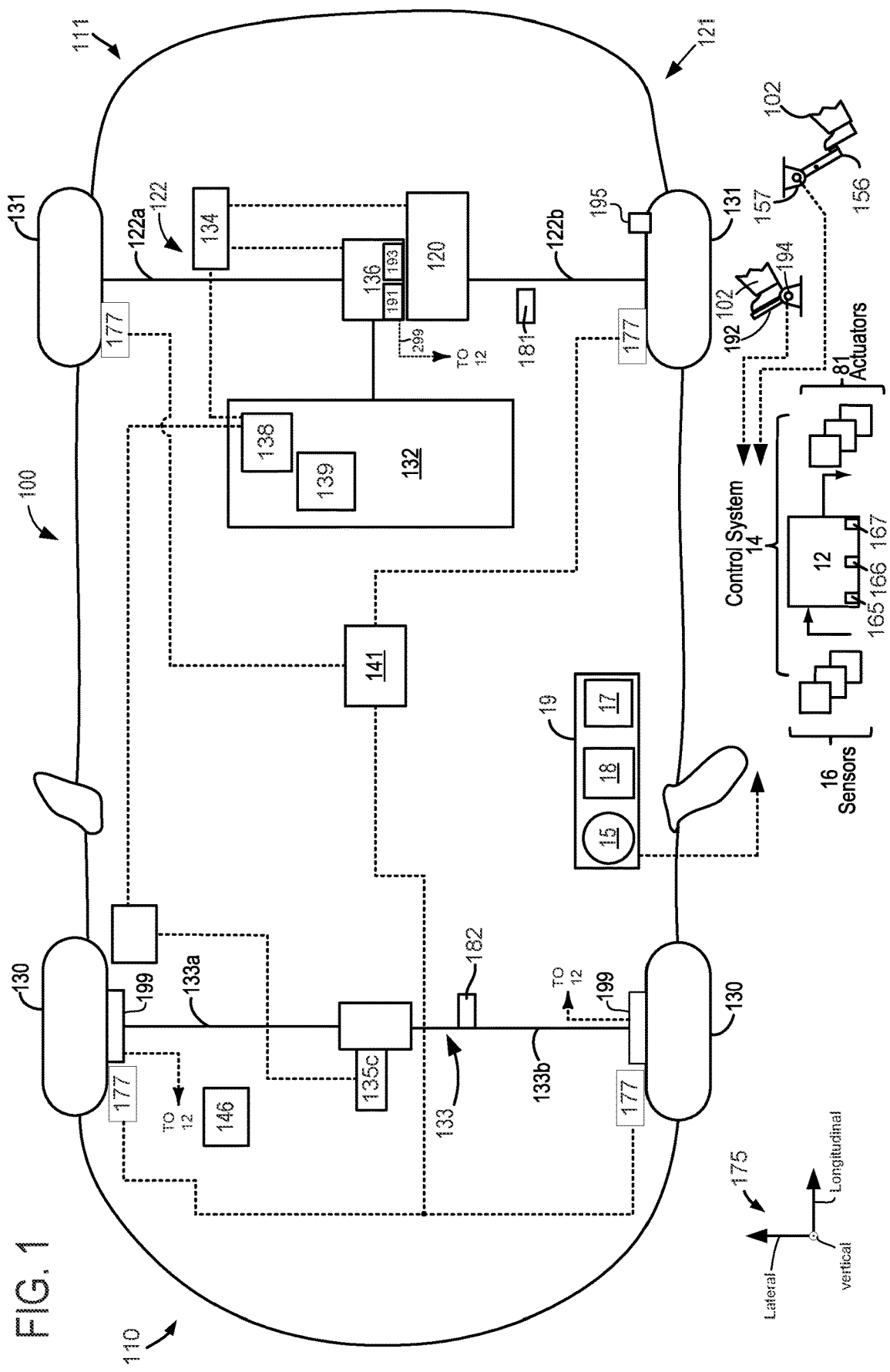
FIG. 1 is a schematic diagram of a vehicle driveline is shown.
Figure 2:
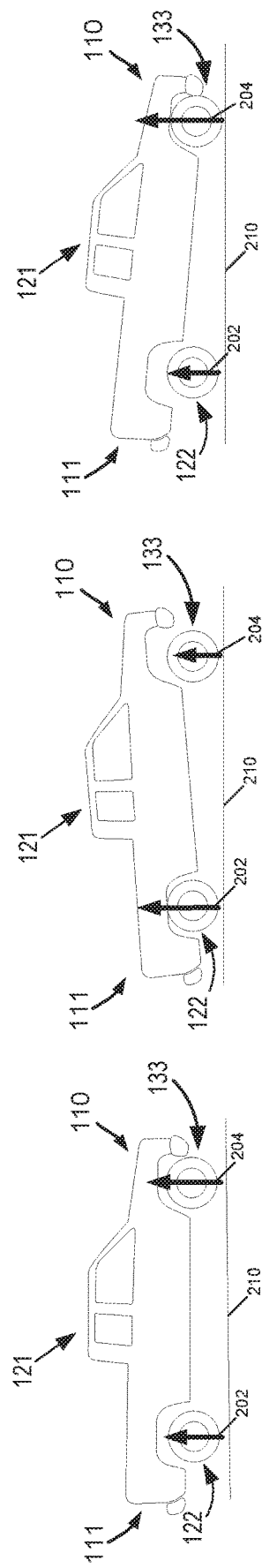
FIGS. 2A-2C illustrate how vehicle and road conditions may change vehicle suspension height.
Figure 3:
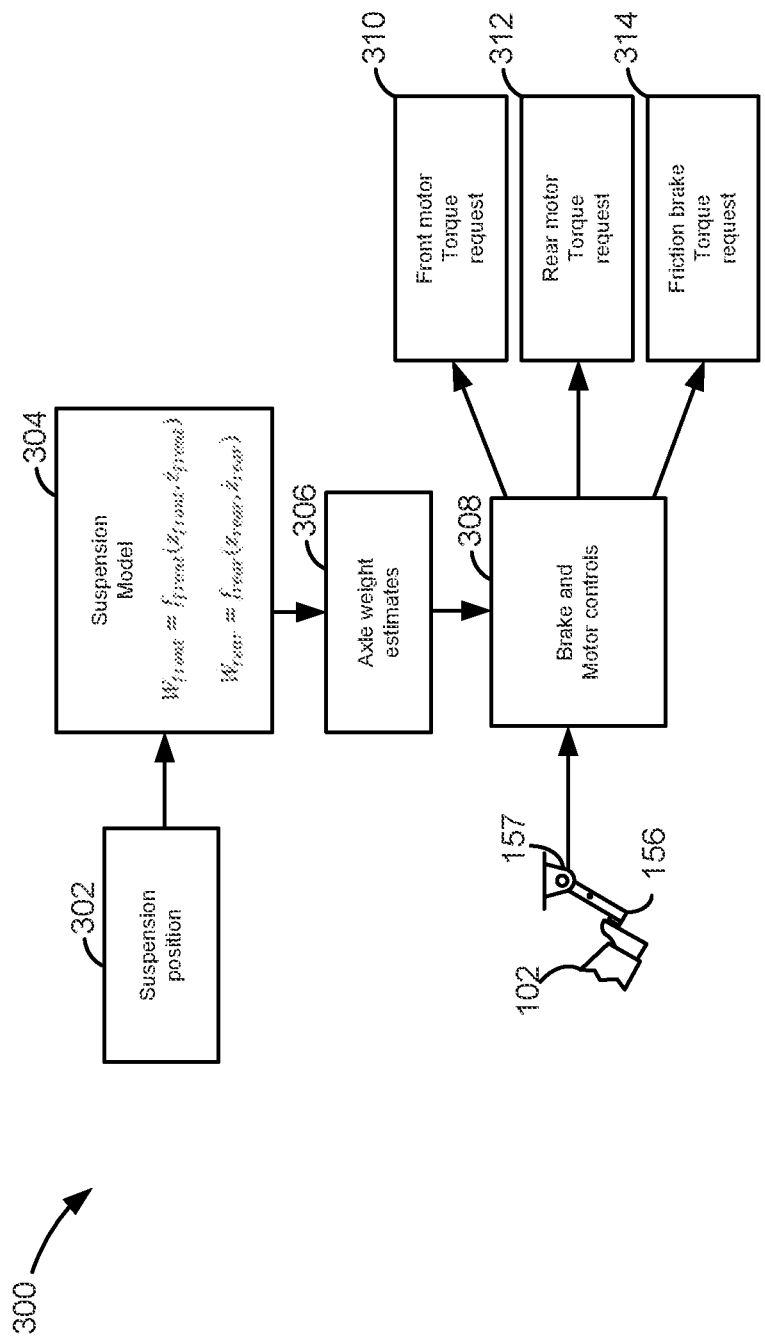
FIG. 3 shows a block diagram of an example vehicle braking system.
Figure 4:
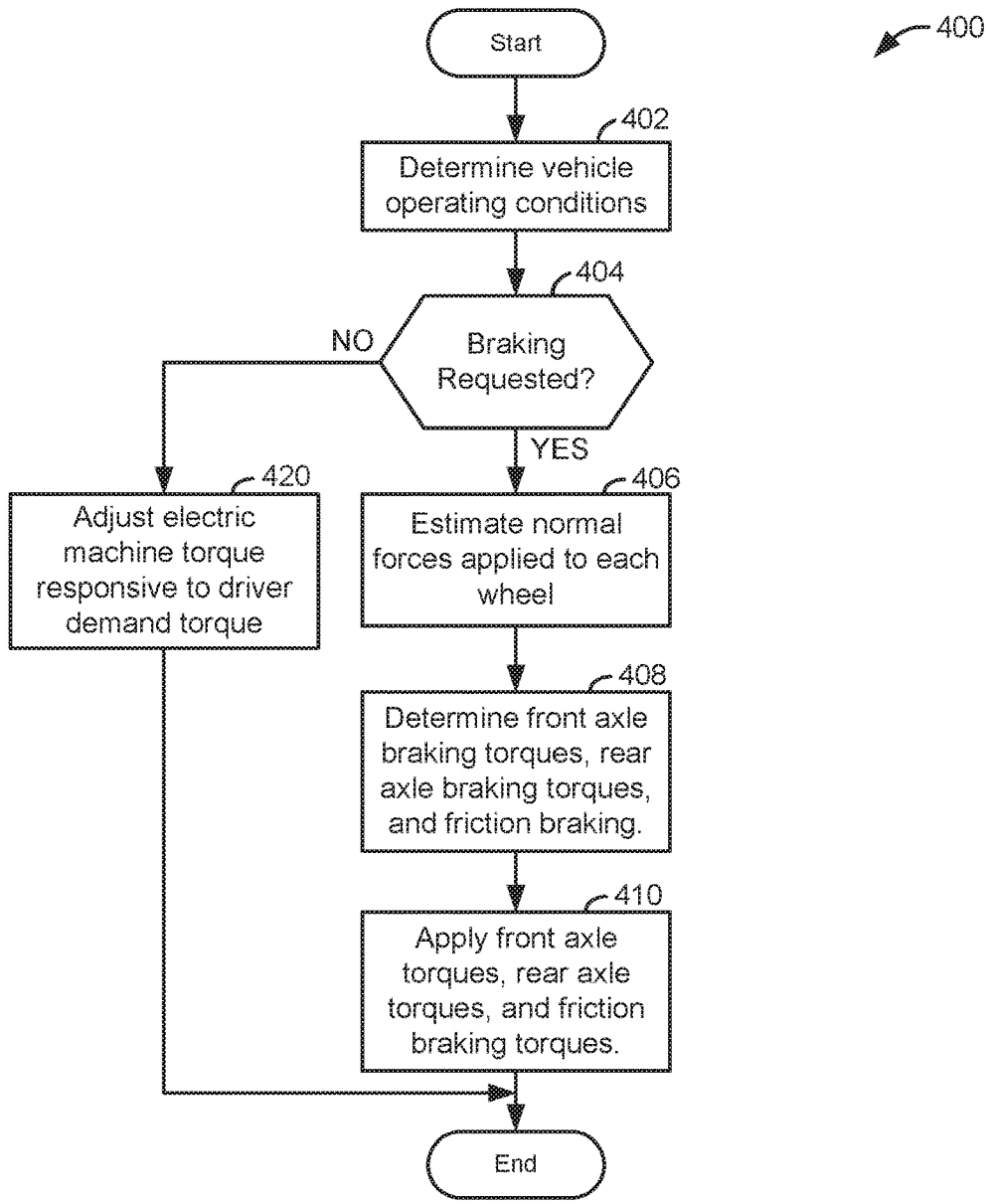
FIG. 4 shows an example method for controlling vehicle braking.

The following description relates to systems and methods for generating braking torque at front and rear vehicle axles. The braking torque may be generated via a first electric machine and a second electric machine. Braking torque may also be provided via friction brakes when braking torque provided by the electric machines is limited. An example vehicle and driveline is shown in FIG. 1. FIGS. 2A-2C show how a vehicle's orientation may affect a normal load that is applied to an axle. A block diagram of an example vehicle braking control system is shown in FIG. 3. An example method for generating vehicle braking torque is shown in FIG. 4. Example vehicle operating sequences are shown in FIGS. 5-7B. Vehicle suspension components and suspension height sensors are shown in FIGS. 8A and 8B.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including electric machine 120 and electric machine 135c. Electric machines 120 and 135c may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122a, and second half shaft 122b. Likewise, front axle 133 may comprise a first half shaft 133a and a second half shaft 133b. Vehicle propulsion system 100 further has front wheels 130 and rear wheels 131. In this example, front wheels 130 may be selectively driven via electric machine 135c. Wheel end disconnects 199 may mechanically decouple front wheels 130 from electric machine 135c and first and second half shafts 133a and 133b when vehicle 121 is not operating in a four wheel drive mode. Further, wheel end disconnects 199 may mechanically couple front wheels 130 to electric machine 135c and first and second half shafts 133a and 133b when vehicle 121 is operating in a four wheel drive mode. Rear wheels 131 may be driven via electric machine 120.

The rear axle 122 is coupled to electric machine 120. Rear drive unit 136 may transfer power from electric machine 120 to axle 122 resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drive unit 136 may also include one or more clutches (not shown) to decouple electric machine 120 from wheels 131. Rear drive unit 136 may be directly coupled to electric machine 120 and axle 122.

Electric machines 120 and 135c may receive electrical power from onboard electrical energy storage device 132. Furthermore, electric machines 120 and 135c may provide a generator function to convert the vehicle's kinetic energy into electrical energy, where the electrical energy may be stored at electric energy storage device 132 for later use by the electric machine 120 and/or electric machine 135c. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120, electric machine 135c, energy storage device 132, wheel end disconnects 199, etc. Control system 14 may receive sensory feedback information from one or more of electric machine 120, electric machine 135c, energy storage device 132, etc. Further, control system 14 may send control signals to one or more of electric machine 120, electric machine 135c, wheel end disconnects 199, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195. BSCM 141 may control a vehicle braking torque provided via friction brakes 177.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, rear suspension height sensor 181, front suspension height sensor 182, etc. In some examples, sensors associated with electric machine 120, electric machine 135c, wheel speed sensor 195, position sensors that describe the couple/uncouple state of the wheel end disconnect, etc., may communicate information to controller 12, regarding various states of electric machine operation. Controller 12 includes non-transitory (e.g., read only memory) 165, random access memory 166, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle.

In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI) display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 120 and electric machine 135c) based on an operator input. Various examples of the operator ignition interface 15 may include interfaces that require a physical apparatus, such as an active key, that may be inserted into the operator interface 15 to start the electric machines 120 and 135c and to turn on the vehicle, or may be removed to shut down the electric machines 120 and 135c to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 120 and 135c. Rather, the passive key may need to be located inside or proximate to the vehicle (e.g., within a threshold distance of the vehicle). Still other examples may additionally or optionally use a start/stop button that is manually pressed by the operator to start or shut down the electric machines 120 and 135c to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the engine. Spatial orientation of vehicle 121 is indicated via axes 175.

The system of FIG. 1 provides for a vehicle system, comprising: a first electric machine coupled to a front axle; a second electric machine coupled to a rear axle; a front sensor including an output that is indicative of a front axle normal load; a rear sensor including an output that is indicative of a rear axle normal load; and a controller including executable instructions stored in non-transitory memory to adjust an amount of braking torque applied to a front axle via the first electric machine and adjusting an amount of braking torque applied to a rear axle via the second electric machine according to an output of the front sensor and output of the rear sensor in response to a braking request. The system further comprises additional instructions to adjust a relationship between the output of the front sensor and a normal load applied to the front axle in response to front wheel slip. The system further comprises additional instructions to adjust a relationship between the output of the rear sensor and a normal load applied to the rear axle in response to rear wheel slip. The system includes where the amount of braking torque applied to the front axle is based on a ratio of a normal force on the front axle to a sum of the normal force on the front axle plus a normal force on the rear axle. The system includes where the amount of braking torque applied to the rear axle is based on a ratio of a normal force on the rear axle to a sum of the normal force on the rear axle plus a normal force on the front axle. The system further comprises additional instructions to filter the output of the front sensor via a low pass filter having a cut-off frequency below five hertz.

Turning now to FIGS. 2A-2C, figures illustrating how height of a vehicle suspension may change are shown. FIG. 2A shows how a vehicle suspension may be oriented when the vehicle is traveling at a constant speed. FIG. 2B shows how a vehicle suspension may be oriented when the vehicle is accelerating. FIG. 2C shows how the vehicle suspension may be oriented when the vehicle is decelerating. Each of FIGS. 2A-2C includes a rear suspension force vector 202 and a front suspension force vector 204. The length of the rear suspension force vector 202 indicates a normal force that is applied via the ground 210 to support the vehicle's rear side 111. The length of the front suspension force vector 204 indicates a normal force that is applied via the ground to support the vehicle's front side 110. The longer the vectors 202 and 204 are, the greater the force that is indicated by the vector. The shorter the vectors 202 and 204 are, the smaller the force that is indicated by the vector. The same vehicle is shown in FIGS. 2A-2C.

FIG. 2A shows that the length of vector 204 is greater than the length of vector 202 when the vehicle is traveling at a constant speed. This indicates that the front axle is supporting a greater weight than the rear axle. The vehicle's suspension is not compressed via vehicle acceleration or vehicle deceleration. In this example, the electric machine 135c located at the front side 110 of vehicle 121 weighs more than electric machine 120 located at the rear side 111 of vehicle 121. Consequently, while the vehicle is not accelerating or decelerating, a greater normal load is applied to the front axle 133 than the rear axle 122.

FIG. 2B shows vehicle 121 accelerating. The length of vector 204 is shorter than the length of vector 202 when the vehicle is accelerating. This indicates that the front axle is supporting a smaller weight than the rear axle due to the transfer of weight to the vehicle's rear axle 122 that is caused via the vehicle acceleration. The vehicle's front suspension (not shown) is expanded and the vehicle's rear suspension (not shown) is compressed via the vehicle's acceleration. Consequently, while the vehicle is accelerating, a greater normal load is applied to the rear axle 122 than the front axle 133.

FIG. 2C shows vehicle 121 decelerating. The length of vector 204 is longer than the length of vector 204 when the vehicle is decelerating. This indicates that the rear axle is supporting a smaller weight than the front axle due to the transfer of weight to the vehicle's front axle 122 that is caused via the vehicle deceleration. The vehicle's front suspension (not shown) is compressed and the vehicle's rear suspension (not shown) is expanded via the vehicle's deceleration. Consequently, while the vehicle is decelerating, a greater normal load is applied to the front axle 133 than the rear axle 122.

Thus, it may be observed that the normal load that is applied to the front axle and the normal load that is applied to the rear axle of a vehicle may change for different vehicle operating conditions. The normal load that is applied to an axle influences an amount of braking torque that may be applied wheels that are coupled to the axle. Specifically, the amount of braking torque that may be applied to an axle without inducing wheel locking or slip (e.g., relative motion between the wheel and the ground) between the wheel and the ground may be increased as the normal load that is applied to the axle increases. Further, the amount of braking torque that may be applied to an axle without inducing wheel locking or slip between the wheel and the ground may be decreased as the normal load that is applied to the axle decreases.

Referring now to FIG. 3, a block diagram of a vehicle braking system is shown. Vehicle braking system receives input from vehicle height suspension sensors at block 302 and the vehicle height data is input to a vehicle suspension model at block 304. The weights or mass that are suspended via the front axle and the rear axle (e.g., the normal loads that are applied to the front and rear axles) are determined at block 306, but blocks 304 and 306 may be combined in some examples. A vehicle braking torque is commanded or requested via human driver 102 and it is input to brake pedal 156. Brake pedal sensor 157 provides input to block 308 along with block 306. Friction brake commands and electric machine commands are determined at block 308 responsive to the vehicle braking torque request and the normal loads that are applied to the front and rear axles. The front electric machine torque request is delivered to the front axle at 310. The rear electric machine torque request is delivered to the rear axle at 312. The friction braking torque request is delivered to the friction brakes at 314.

Referring now to FIG. 4, an example method for operating a vehicle that includes a first electric machine coupled to a first axle and a second electric machine coupled to a second axle is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to height of rear vehicle suspension, height of front vehicle suspension, accelerator pedal position, and brake pedal position. Method 400 proceeds to 404.

At 404, method 400 judges if vehicle braking is requested. Vehicle braking may be requested when the brake pedal is applied or if the accelerator pedal is not applied. If method 400 judges that vehicle braking is requested, the answer is yes and method 400 proceeds to 406. Otherwise, the answer is no and method 400 proceeds to 420.

At 420, method 400 adjusts torque output from the first electric machine and the second electric machine responsive to a driver demand torque. The driver demand torque may be determined via accelerator pedal position. In one example, accelerator pedal position is input to a function and the function outputs a driver demand torque in response to the accelerator pedal position. The function may include empirically determined driver demand torque values that may be determined via operating the vehicle on a dynamometer and adjusting driver demand torque values responsive to accelerator pedal position. The first electric machine may be commanded to provide the first portion of the driver demand torque and the second electric machine may be commanded to provide the second portion of the driver demand torque. The first portion and the second portion may be empirically determined based on vehicle operating conditions. Method 400 proceeds to exit.

At 406, method 400 estimates the normal forces that are applied to the front axle and the normal forces that are applied to the rear axle via the following equations:

$$W_{front} = f_{front}(z_{front}, \dot{z}_{front})$$

$$W_{rear} = f_{rear}(z_{rear}, \dot{z}_{rear})$$

where $W_{front}$ is the normal load that is applied to the front axle, $f_{front}$ is a function that returns the normal load that is applied to the front axle, $z_{front}$ is the vertical position of the front suspension, $\dot{z}_{front}$ is the vertical velocity of the front suspension, $W_{rear}$ is the normal load that is applied to the rear axle, $f_{rear}$ is a function that returns the normal load that is applied to the rear axle, $z_{rear}$ is the vertical position of the rear suspension, and $\dot{z}_{rear}$ is the vertical velocity of the rear suspension. In some examples, the values of $W_{front}$ and $W_{rear}$ may be low pass filtered with a first order low pass filter that has a cut-off frequency that is below five hertz so that it slip is encountered, the low pass filter may allow method 400 to discount momentary changes in the front to rear normal load distributions, but the low pass filter allows method 400 to respond to actual weight transfer. In one example, the first order low pass filter may be implemented via the following equation: $y(k)=y(k-1)+\alpha(x(k)-y(k-1))$, where y(k) is the filter output, x(k) is the filter input, k is the filter sample number, and a is the filter coefficient. The filter coefficient may be adjusted to change the filter's cut-off frequency (e.g., a frequency where output of the filter is attenuated by a predetermined amount (3 dB)).

In one example, the functions $f_{front}$ and $f_{rear}$ may be a model of the form:

$$m\ddot{z}+\beta\dot{z}+kz=F(t)$$

where m is the mass or normal load that is applied to the axle, z is the vertical position of the suspension (front or rear), $\beta$ is a dampener constant of the suspension (front or rear), k is the spring constant of the suspension (front or rear), and F(t) is any external input force to the suspension (front or rear). The model may be solved to determine m according to the vertical position of the suspension z, the dampening constant $\beta$, and the spring constant k.

In other examples, a function may be stored in controller memory that generates a mass or normal load that is applied to an axle as a function of suspension height. The values of the function may be empirically determined via applying loads to the front and rear suspensions of the vehicle while recording the suspension height. The values in the function may be increased or decreased in response to detection of wheel slip so that estimates of the normal load applied to the axle may be improved. Method 400 proceeds to 408 after determining the normal loads that are applied to the front and rear axles.

At 408, method 400 determines the front axle torque, the rear axle torque, and the friction braking torques. The torque values in the equations below are positive for braking torque. The axle torques may be determined via the following equations:

$$Tq_{total,front} = Tq_{whlreq} \times \frac{W_{front}}{W_{front} + W_{rear}}$$

$$Tq_{total,rear} = Tq_{whlreq} \times \frac{W_{rear}}{W_{front} + W_{rear}}$$

where $Tq_{total,front}$ is the total requested front axle torque, $Tq_{whlreq}$ is the requested wheel torque for front and rear axles, $W_{front}$ is the normal load that is applied to the front axle, $W_{rear}$ is the normal load that is applied to the rear axle, and $Tq_{total,rear}$ is the total requested rear axle torque.

Method 400 solves for minimum torque the friction brakes provide based on electric machine torque limits via the following equations:

$$Tq_{min\ brake,front} = \max(0, Tq_{total,front} - Tq_{motor\ limit,front} \times rt_{motor\ to\ wheels,front})$$

$$Tq_{min\ brake,rear} = \max(0, Tq_{total,rear} - Tq_{motor\ limit,rear} \times rt_{motor\ to\ wheels,rear})$$

where $Tq_{min\ brake,front}$ is the minimum braking torque that is provided via the front friction brakes, max is a function that returns a maximum value of the first argument (e.g., 0) or the second argument (e.g., $Tq_{total,front} - Tq_{motor\ limit,front} \times rt_{motor\ to\ wheels,front}$), $Tq_{min\ brake,rear}$ is the minimum braking torque that is provided via the rear friction brakes, $Tq_{motor\ limit,front}$ is the electric machine torque limit for the front electric machine, $Tq_{motor\ limit,rear}$ is the electric machine torque limit for the rear electric machine, $rt_{motor\ to\ wheels,front}$ is the torque ratio between the front electric machine and the front wheels, and $rt_{motor\ to\ wheels,rear}$ is the torque ratio between the rear electric machine and the rear wheels.

For embodiments where the friction braking torque split is fixed (e.g., a proportioning valve determines the friction brake torque split):

If $Tq_{min\ brake,\ front} = Tq_{min\ brake,\ rear} = 0$, then the electric machines may provide all of the braking torque so that front electric machine torque $Tq_{motor,front} = Tq_{total,front} / rt_{motor\ to\ wheels,front}$; rear electric machine torque $Tq_{motor,rear} = Tq_{total,rear} / rt_{motor\ to\ wheels,rear}$; front friction brake torque $Tq_{brakes,front} = 0$; and rear friction brake torque $Tq_{brakes,\ rear} = 0$. Otherwise, if $$\frac{Tq_{minbrake,front}}{Tq_{minbrake,rear}} < rt_{brakes}$$

(e.g., if a ratio of minimum front friction braking torque to minimum rear friction braking torque is less than a fixed torque ratio between front and rear friction brakes), the rear electric machine is the limiting device such that rear axle torque is provided via rear friction brakes and front friction brake torque is based on a fixed friction brake torque split: $Tq_{motor,\ rear} = Tq_{motor\ limit,\ rear}$; $Tq_{brakes,rear} = Tq_{total,\ rear} - (Tq_{motor,\ rear} \times rt_{motor\ to\ wheels,\ rear})$; $Tq_{brakes,front} = Tq_{brakes,\ rear} \times rt_{brakes}$; $Tq_{motor\_front} = (Tq_{total,front} - Tq_{brakes,\ front})/rt_{motor\ to\ wheels,\ front}$. Otherwise, the front electric machine is the limiting device such that the front axle torque is provided with front friction brakes and the rear friction brake torque is based on the fixed friction brake torque split: $Tq_{motor,\ front} = Tq_{motor\ limit,\ front}$; $Tq_{brakes,front} = Tq_{total,\ front} - (Tq_{motor,front} \times rt_{motor\ to\ wheels,front})$; $Tq_{brakes,rear} = Tq_{brakes,\ rear} = Tq_{brakes,\ front}/rt_{brakes}$; $Tq_{motor\_rear} = (Tq_{total,rear} - Tq_{brakes,\ rear})/rt_{motor\ to\ wheels,\ rear}$.

For embodiments where the friction braking torque split is variable: $Tq_{motor,\ front} = \min(Tq_{total,front}/rt_{motor\ to\ wheels,\ front}, Tq_{motor\ limit,\ front})$; $Tq_{motor,\ rear} = \min(Tq_{total,rear}/rt_{motor\ to\ wheels,\ rear}, Tq_{motor\ limit,\ rear})$; $Tq_{brakes,front} = Tq_{total,front} - (Tq_{motor,front} \times rt_{motor\ to\ wheels,front})$; and $Tq_{brakes,\ rear} = Tq_{total,rear} - (Tq_{motor,\ rear} \times rt_{motor\ to\ wheels,\ rear})$. Min is a function that returns a minimum of first and second arguments.

During conditions where braking torque and friction torque are adjusted as previously described and wheel slip is encountered, then method 400 may adjust the vehicle suspension model or a transfer function that describes a relationship between output of a sensor and normal load that is applied to an axle. For example, if wheel slip is encountered method 400 may incrementally adjust the value of the spring constant k by a predetermined amount so that the estimated normal load on the axle may be adjusted. By adjusting the spring constant, the normal load on the axle may be adjusted to reduce the possibility of subsequent wheel slip. In another example, a numeric value in a transfer function describing a relationship between output of a sensor and a normal load that is applied to an axle may be adjusted in response to wheel slip so that an estimate of the normal load may be improved, thereby improving torque delivery to the vehicle's axles. Method 400 proceeds to 410.

At 410, method 400 commands the front friction brakes, the rear friction brakes, the front electric machine, and the rear electric machine according to the braking torques determined at 408. Method 400 proceeds to exit.

Thus, the method of FIG. 4 adjusts torque of two electric machines and friction brakes responsive to normal loads or forces that are applied to front and rear axles. The torque adjustments may be based on the normal loads as the normal loads are determined via suspension models. If wheel slip is found, the models may be updated to adjust the normal load so that the possibility of generating additional wheel slip may be reduced. In addition, the method of FIG. 4 may filter the normal load values so that the possibility of generating wheel slip may be reduced.

The method of FIG. 4 provides for a method for braking a vehicle, comprising: adjusting an amount of braking torque applied to a front axle via a first electric machine and adjusting an amount of braking torque applied to a rear axle via a second electric machine according to an output of a sensor that is indicative of front axle normal load and output of a sensor that is indicative or rear axle normal load in response to a braking request. The method further comprises adjusting an amount of braking torque applied to the front axle via front axle friction brakes. The method further comprises adjusting an amount of braking torque applied to the rear axle via rear axle friction brakes. The method includes where the amount of braking torque applied to the front axle via the friction brakes is a fixed proportion to the amount of braking torque applied to the rear axle via the rear axle friction brakes. The method includes where the amount of braking torque applied to the front axle via the friction brakes is not a fixed proportion to the amount of braking torque applied to the rear axle via the rear axle friction brakes. The method includes where the amount of braking torque applied to the front axle is based on a ratio of a normal force on the front axle to a sum of the normal force on the front axle plus a normal force on the rear axle. The method includes where the amount of braking torque applied to the rear axle is based on a ratio of a normal force on the rear axle to a sum of the normal force on the rear axle plus a normal force on the front axle.

The method of FIG. 4 also provides for a method for braking a vehicle, comprising: adjusting an amount of braking torque applied to a front axle via a first electric machine and adjusting an amount of braking torque applied to a rear axle via a second electric machine according to a low pass filtered output of a sensor that is indicative of front axle normal load and output of a low pass filtered output of a sensor that is indicative of rear axle normal load in response to a braking request, where the low pass filtered output of the sensor that is indicative of front axle normal load is filtered via a first low pass filter, the first low pass filter including a cut-off frequency that is less than five hertz. The method includes where the amount of braking torque applied to the front axle is based on a ratio of a normal force on the front axle to a sum of the normal force on the front axle plus a normal force on the rear axle. The method includes where the amount of braking torque applied to the rear axle is based on a ratio of a normal force on the rear axle to a sum of the normal force on the rear axle plus a normal force on the front axle. The method includes where the low pass filtered output of the sensor that is indicative or rear axle normal load is filtered via a second low pass filter, the second low pass filter including a cut-off frequency that is less than five hertz. The method includes where the braking request is based on application of a brake pedal. The method further comprises estimating a normal load applied to the front axle in response to the low pass filtered output of the sensor that is indicative of front axle normal load. The method further comprises estimating a normal load applied to the rear axle in response to the low pass filtered output of the sensor that is indicative of rear axle normal load.

Figure 5:
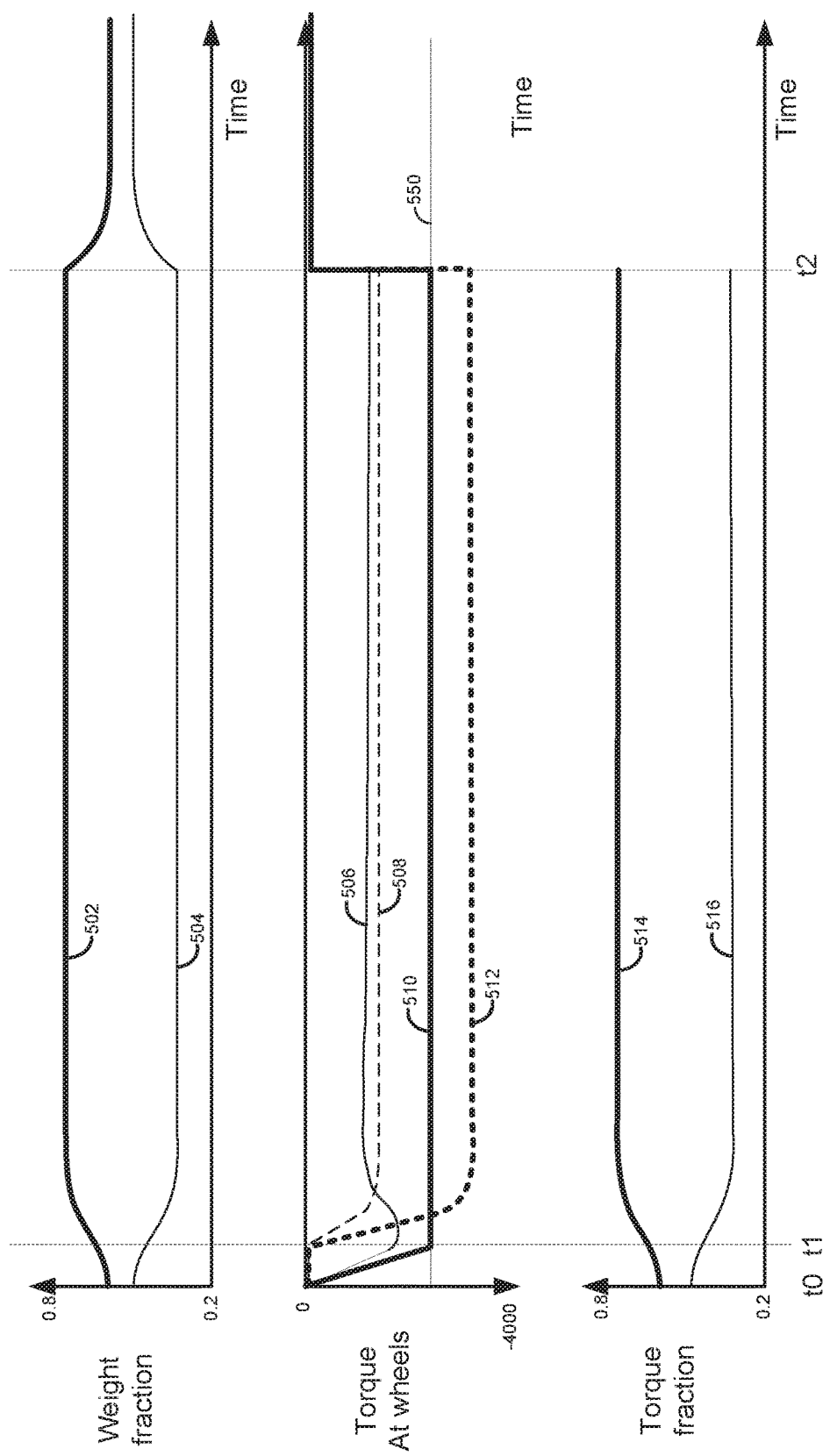
FIGS. 5-7B show example vehicle braking sequences.

Referring now to FIG. 5, a prophetic operating sequence according to the method of FIG. 4 is shown. The vehicle operating sequence shown in FIG. 5 may be provided via the method of FIG. 4 in cooperation with the system shown in FIG. 1. The plots shown in FIG. 5 occur at the same time and are aligned in time. The vertical lines at t0-t2 represent times of interest during the sequence.

The first plot from the top of FIG. 5 is a plot of axle weight fraction (e.g., a fraction of weight of a vehicle supported via an axle of the vehicle) versus time. The vertical axis represents axle weight fraction and the axle weight fraction increases in the direction of the vertical axis arrow. The horizontal axis represents time and time increases from the left side of the figure to the right side of the figure. Trace 502 represents the axle weight fraction for the front axle. Trace 504 represents the axle weight fraction for the rear axle.

The second plot from the top of FIG. 5 is a plot of torque at the vehicle's wheels versus time. The vertical axis represents torque at the vehicle's wheels and the magnitude of the torque increases in the direction of the vertical axis arrow. The horizontal axis represents time and time increases from the left side of the figure to the right side of the figure. Line 506 represents the torque provided via the rear electric machine at the rear wheels. Line 508 represents torque provided via friction brakes at the rear wheels. Line 510 represents the torque provided via the front electric machine at the front wheels. Line 512 represents the torque provided via the front friction brakes at the front wheels. Line 550 represents an electric machine torque limit at the front wheels.

The third plot from the top of FIG. 5 is a plot of braking torque fraction versus time. The vertical axis represents braking torque fraction and the braking torque fraction increases in the direction of the vertical axis arrow. The horizontal axis represents time and time increases from the left side of the figure to the right side of the figure. Trace 514 represents the front axle braking torque fraction. Trace 516 represents the rear axle braking torque fraction.

At time t0, braking torque is requested and torque is applied to the front wheels via the front electric machine. Torque is also applied to the rear wheels via the rear electric machine. The front axle weight fraction begins to increase as braking force is applied to the wheels causing the vehicle's suspension to shift and compress the vehicle's front springs. The friction brakes are not applied at time t0 since the electric machines are generating the requested torque amount (not shown). The torque fraction provided via front wheels increases and the torque fraction provided via the rear wheels decreases.

At time t1, the front electric machine meets its braking torque limit and then friction braking torque begins to be applied to the front and rear wheels. The weight fraction of the front axle continues to increase as the magnitude of the braking torque supplied to the front and rear axles increases. The weight fraction of the rear axle continues to decrease as the magnitude of the braking torque supplied to the front and rear axles increases. The torque fraction of the front axle is increased to match the weight fraction increase of the front axle. The torque fraction of the rear axle is decreased to match the weight fraction decrease of the rear axle. The braking torque that is supplied by the rear motor begins decreasing as the braking torque of the friction brakes applied to the rear axle begin to increase with the friction braking torque of the front axle so that the possibility of rear wheel slip may be reduced. The braking torque that is supplied by the front electric machine ceases to increase and becomes constant.

Between time t1 and time t2, the braking torque that is provided via the rear friction brakes and rear electric machine level off to constant values. Likewise, the braking torques of the front electric machine and the front brakes level of to constant values. The front axle weight fraction and the rear axle weight fraction level off at constant levels. The torque fraction of the front axle and the torque fraction of the rear axle level off at levels that are a function of the weight fractions of the front and rear axles.

At time t2, the braking request is withdrawn (not shown). The braking torques provided via the front friction brakes, rear friction brakes, front electric machine, and rear electric machine are reduced to zero in response to the braking request being withdrawn. The torque fraction of the front and rear axle are no longer present since braking torque is not applied. The weight fraction of the front axle is reduced and the weight fraction of the rear axle is increased in response to the elimination of braking torque. The weight fraction of the front axle is greater than the weight fraction of the rear axle because the front axle is supporting more weight than the rear axle.

Thus, the torque fraction that is supplied to each axle may be adjusted responsive to the weight fraction of each axle. Further, the front and rear friction braking torques may be adjusted responsive to the braking torques of the front electric machine so as to improve regenerative braking while providing a requested braking torque.

Figure 6A:
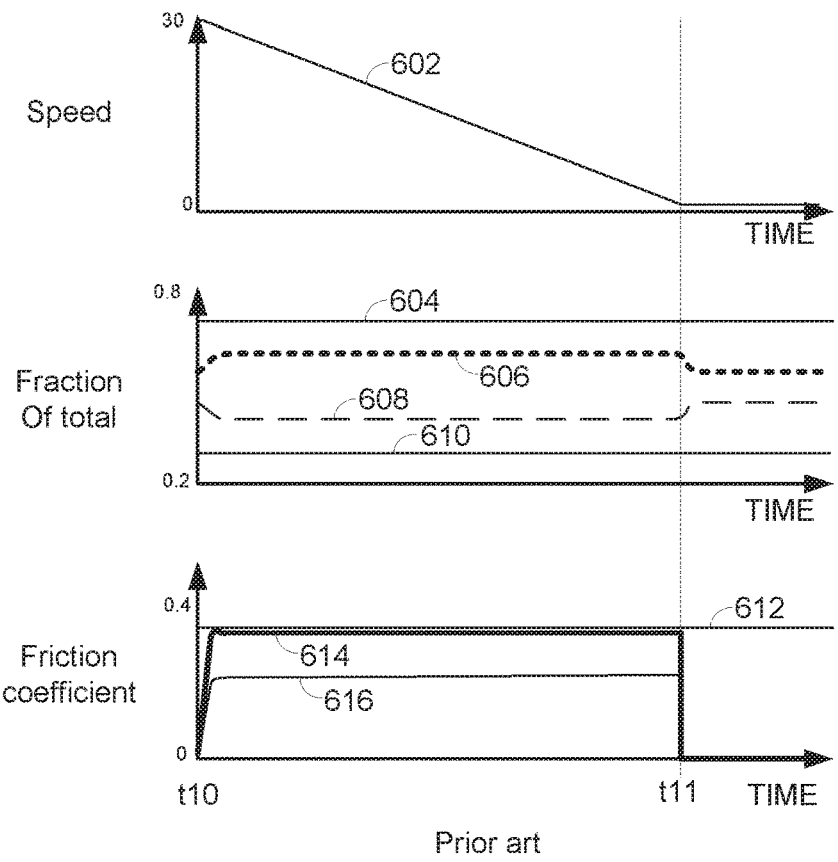

Referring now to FIG. 6A, a prior art prophetic vehicle braking sequence is shown. In this example, the vehicle is decelerated from 30 miles/hour to 0 miles/hour when a maximum coefficient of friction between the wheel's tire and the road is $\mu=0.3$ and braking is provided only via friction brakes. The vehicle at rest has a weight split of 55% front axle to 45% rear axle. During this example, an additional 5% of the vehicle's weight is transferred to the vehicle's front axle. The vehicle has a fixed 70% front axle to 30% rear axle braking torque split due to the friction brakes.

The first plot from the top of FIG. 6A is a plot of vehicle speed versus time. The vertical axis represents vehicle speed and vehicle speed increases in the direction of the vertical axis arrow. The horizontal axis represents time and time increases from the left side of the figure to the right side of the figure. Trace 602 represents vehicle speed.

The second plot from the top of FIG. 6A is a fraction of total metric being observed (e.g., vehicle weight over an axle or braking torque) versus time. The vertical axis represents fraction of the total metric being observed and the fraction of the total metric being observed increases in the direction of the vertical axis arrow. The horizontal axis represents time and time increases from the left side of the figure to the right side of the figure. Trace 604 represents the fraction of total braking torque that is provided via front friction brakes. Trace 606 represents a fraction of vehicle weight that is supported via the front axle. Trace 608 represents a fraction of vehicle weight that is supported via the rear axle. Trace 610 represents the fraction of total braking torque that is provided via the rear friction brakes.

The third plot from the top of FIG. 6A is a plot of friction coefficient between a road surface and the tires of the vehicle versus time. The vertical axis represents the friction coefficient between a road surface and the tires of the vehicle. The horizontal axis represents time and time increases from the left side of the figure to the right side of the figure. Trace 612 represents the maximum coefficient of friction between the tire and the road. Trace 614 represents the coefficient of friction between the front tires and the road. Trace 616 represents the coefficient of friction between the rear tires and the road.

At time t10, the breaking request is asserted (not shown) and the friction brakes are applied (not shown). The fraction of a total vehicle weight that is supported by the front axle begins to increase. The fraction of the total vehicle weight that is supported via the rear axle begins to decrease as the vehicle's suspension complies in response to the vehicle braking. The vehicle begins decelerating and the friction coefficient between the front tires and the road increases up to the maximum coefficient of friction between the tires and the road shortly after time t10. The friction coefficient between the rear tires and the road is substantially less than the maximum coefficient of friction between the front tires and the road because the braking torque split is 70/30.

Between time t10 and time t11, the fraction of total vehicle weight supported via the front axle levels off at a higher value than it started at time t10. The fraction of total vehicle weight supported via the rear axle levels off at a lower value that it started at time t10. Similarly, the friction coefficient between the front tires and the road levels off at a higher value than it started at time t10. The friction coefficient between the rear tires and the road levels off at a value that is higher value that it started at time t10. The vehicle continues to decelerate.

At time t11, the vehicle comes to a full stop and the brake pedal is released (not shown). The fraction of total vehicle weight supported via the front axle levels falls to its original value where it started at time t10. The fraction of total vehicle weight supported via the rear axle increases to the level of its original value where it started at time t10. The friction coefficient between the front tires and the road falls to zero when the vehicle stops. The friction coefficient between the rear tires and the road falls to zero when the vehicle stops.

Figure 6B:
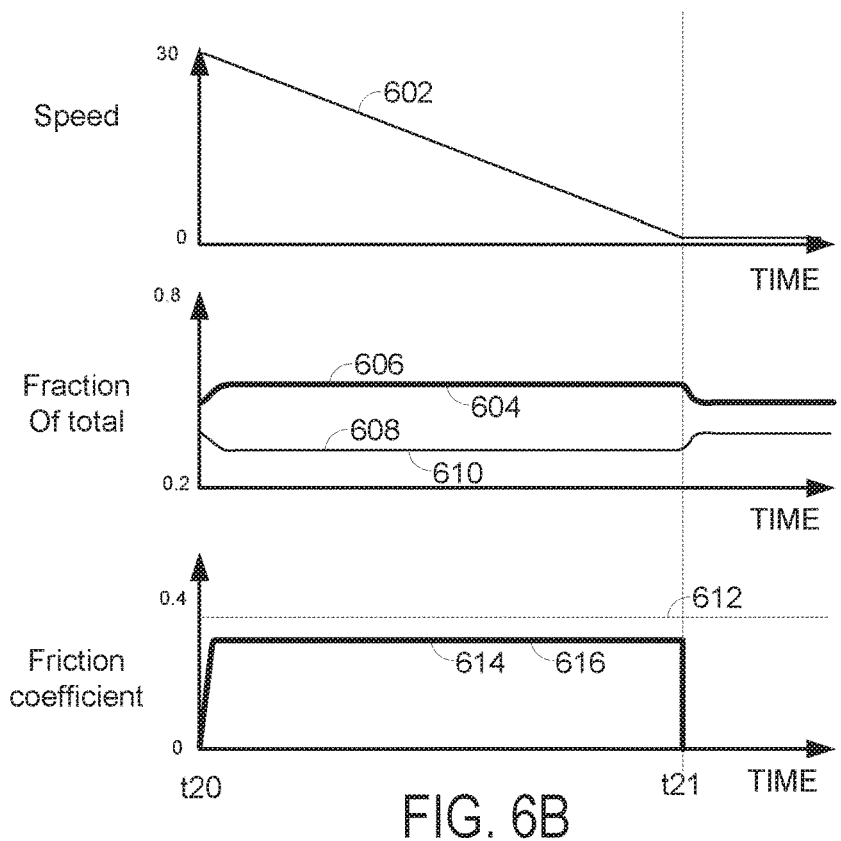

Referring now to FIG. 6B, a prophetic vehicle braking sequence according to the method of FIG. 4 is shown. In this example, the vehicle is decelerated from 30 miles/hour to 0 miles/hour when a maximum coefficient of friction between the wheel's tire and the road is μ=0.3 and braking is provided via front and rear electric machines. The vehicle at rest has a weight split of 55% front axle to 45% rear axle.

The first plot from the top of FIG. 6B is a plot of vehicle speed versus time. The vertical axis represents vehicle speed and vehicle speed increases in the direction of the vertical axis arrow. The horizontal axis represents time and time increases from the left side of the figure to the right side of the figure. Trace 602 represents vehicle speed.

The second plot from the top of FIG. 6B is a fraction of total metric being observed (e.g., vehicle weight over an axle or braking torque) versus time. The vertical axis represents fraction of the total metric being observed and the fraction of the total metric being observed increases in the direction of the vertical axis arrow. The horizontal axis represents time and time increases from the left side of the figure to the right side of the figure. Trace 604 represents the fraction of total braking torque that is provided via front friction brakes. Trace 606 represents a fraction of vehicle weight that is supported via the front axle. In this example, trace 604 and trace 606 overlap at all times so only a single trace is visible. Trace 608 represents a fraction of vehicle weight that is supported via the rear axle. Trace 610 represents the fraction of total braking torque that is provided via the rear friction brakes. In this example, trace 608 and trace 610 overlap at all times so only a single trace is visible.

The third plot from the top of FIG. 6B is a plot of friction coefficient between a road surface and the tires of the vehicle versus time. The vertical axis represents the friction coefficient between a road surface and the tires of the vehicle. The horizontal axis represents time and time increases from the left side of the figure to the right side of the figure. Trace 612 represents the maximum coefficient of friction between the tire and the road. Trace 614 represents the coefficient of friction between the front tires and the road. Trace 616 represents the coefficient of friction between the rear tires and the road. In this example, trace 614 and trace 616 overlap at all times so only a single trace is visible.

At time t20, the breaking request is asserted (not shown) and the friction brakes are applied (not shown). The fraction of a total vehicle weight that is supported by the front axle begins to increase and the fraction of total braking torque that is provided via front electric machine increases at a same rate. The fraction of the total vehicle weight that is supported via the rear axle begins to decrease and the fraction of total braking torque that is provided via the rear electric machine decreases at a same rate as the vehicle's suspension complies in response to the vehicle braking. The vehicle begins decelerating and the friction coefficient between the front tires and the road increases up to a level that is less than the maximum coefficient of friction between the tires and the road shortly after time t10. The friction coefficient between the rear tires and the road increases at a same rate as the friction coefficient between the front tires and the road increase.

Between time t20 and time t21, the fraction of total vehicle weight supported via the front axle levels off at a higher value than it started at time t20. The fraction of torque provided to the front wheels via the front electric machine levels off at a same percentage as the fraction of total weight supported by the front axle. The fraction of torque provided to the rear wheels via the rear electric machine levels off at a same percentage as the fraction of total weight supported by the rear axle. Similarly, the friction coefficient between the front tires and the road levels off at a higher value than it started at time t20. The friction coefficient between the rear tires and the road levels off at a same value as the friction coefficient between the front tires and the road. The vehicle continues to decelerate.

At time t21, the vehicle comes to a full stop and the brake pedal is released (not shown). The fraction of total vehicle weight supported via the front axle levels falls to its original value where it started at time t20. The fraction of total vehicle weight supported via the rear axle increased to the level of its original value where it started at time t20. The friction coefficient between the front tires and the road falls to zero when the vehicle stops. The friction coefficient between the rear tires and the road falls to zero when the vehicle stops.

In this way, two electric machines are controlled to provide a torque split or ratio between the front axle and the rear axle that matches the weight split or ratio between the front axle and the rear axle. This may allow the front and rear tires to rotate without exceeding a traction limit, thereby avoiding wheel slip. Further, higher rates of vehicle deceleration may be provided when the torque split ratio matches the weight split ratio during vehicle braking.

Figure 7A:
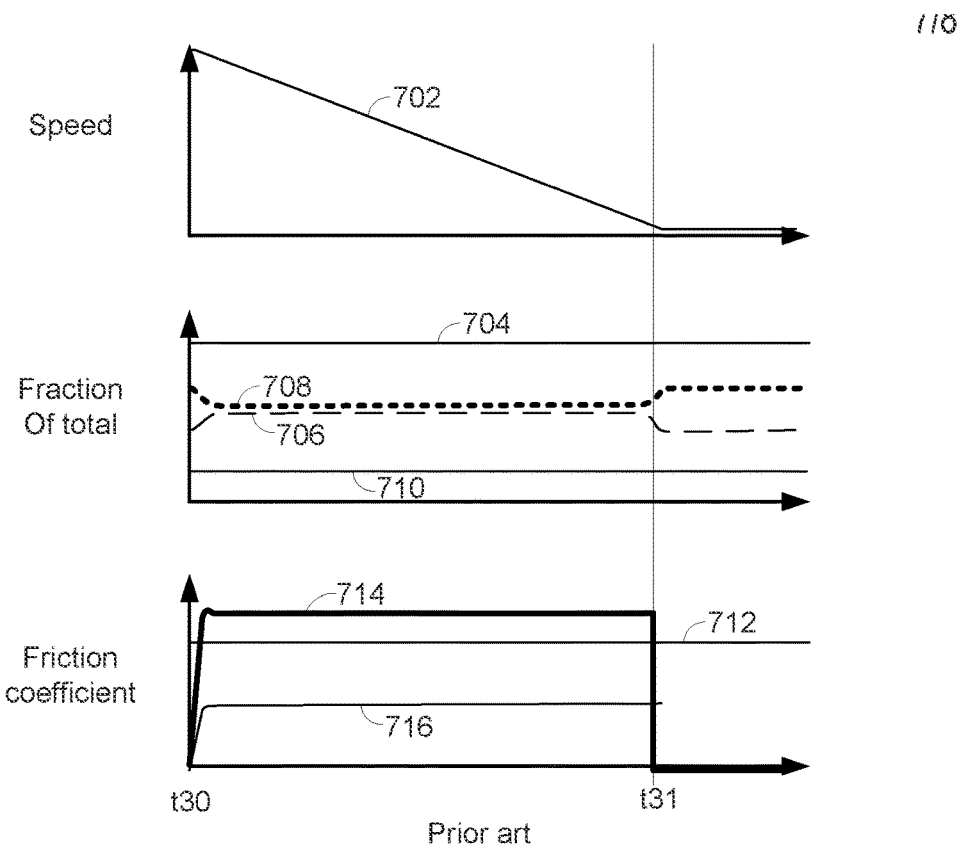
Figure 8A:
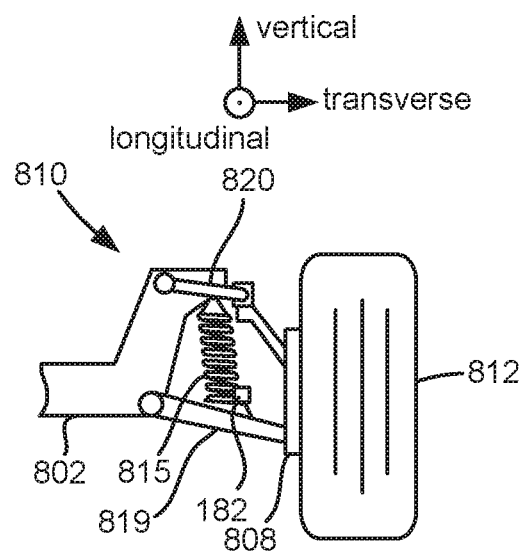
FIGS. 8A and 8B show example vehicle suspension height sensors.
Figure 8B:
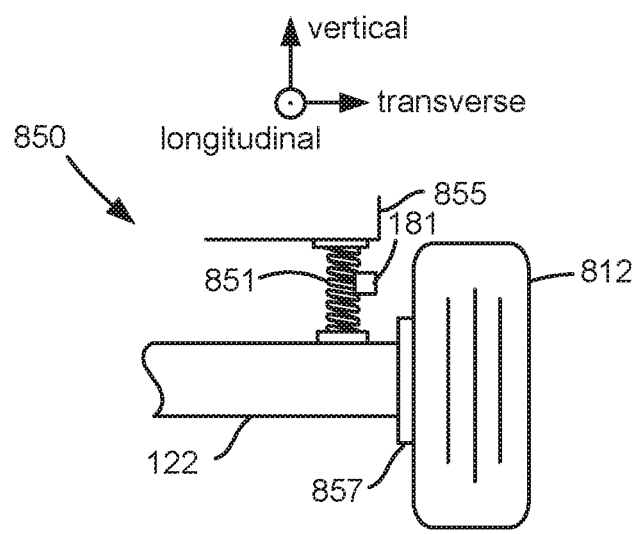

Referring now to FIG. 7A, a prior art prophetic vehicle braking sequence is shown. In this example, the vehicle is decelerated from 30 miles/hour to 0 miles/hour when a maximum coefficient of friction between the wheel's tire and the road is μ=0.3 and braking is provided only via friction brakes. The vehicle is carrying a payload of 2000 pounds in a rear portion of the vehicle. The vehicle at rest has a weight split of 45% front axle to 55% rear axle. The vehicle has a fixed 70% front axle to 30% rear axle braking torque split due to the friction brakes.

The first plot from the top of FIG. 7A is a plot of vehicle speed versus time. The vertical axis represents vehicle speed and vehicle speed increases in the direction of the vertical axis arrow. The horizontal axis represents time and time increases from the left side of the figure to the right side of the figure. Trace 702 represents vehicle speed.

The second plot from the top of FIG. 7A is a fraction of total metric being observed (e.g., vehicle weight over an axle or braking torque) versus time. The vertical axis represents fraction of the total metric being observed and the fraction of the total metric being observed increases in the direction of the vertical axis arrow. The horizontal axis represents time and time increases from the left side of the figure to the right side of the figure. Trace 704 represents the fraction of total braking torque that is provided via front friction brakes. Trace 706 represents a fraction of vehicle weight that is supported via the front axle. Trace 708 represents a fraction of vehicle weight that is supported via the rear axle. Trace 710 represents the fraction of total braking torque that is provided via the rear friction brakes.

The third plot from the top of FIG. 7A is a plot of friction coefficient between a road surface and the tires of the vehicle versus time. The vertical axis represents the friction coefficient between a road surface and the tires of the vehicle. The horizontal axis represents time and time increases from the left side of the figure to the right side of the figure. Trace 712 represents the maximum coefficient of friction between the tire and the road. Trace 714 represents the coefficient of friction between the front tires and the road. Trace 716 represents the coefficient of friction between the rear tires and the road.

At time t30, the breaking request is asserted (not shown) and the friction brakes are applied (not shown). The fraction of a total vehicle weight that is supported by the front axle begins to increase. The fraction of the total vehicle weight that is supported via the rear axle begins to decrease as the vehicle's suspension complies in response to the vehicle braking. The vehicle begins decelerating and the friction coefficient between the front tires and the road increases beyond to the maximum coefficient of friction between the tires and the road shortly after time t30. During such conditions, anti-lock braking may be initiated to reduce wheel slip. The friction coefficient between the rear tires and the road is substantially less than the maximum coefficient of friction between the front tires and the road because the braking torque split is 70/30.

Between time t30 and time t31, the fraction of total vehicle weight supported via the front axle levels off at a higher value than it started at time t30. The fraction of total vehicle weight supported via the rear axle levels off at a lower value that it started at time t30. Similarly, the friction coefficient between the front tires and the road levels off at a higher value than it started at time t30. The friction coefficient between the rear tires and the road levels off at a value that is higher value that it started at time t30. The vehicle continues to decelerate.

At time t31, the vehicle comes to a full stop and the brake pedal is released (not shown). The fraction of total vehicle weight supported via the front axle levels falls to its original value where it started at time t30. The fraction of total vehicle weight supported via the rear axle increases to the level of its original value where it started at time t30. The friction coefficient between the front tires and the road falls to zero when the vehicle stops. The friction coefficient between the rear tires and the road falls to zero when the vehicle stops.

Figure 7B:
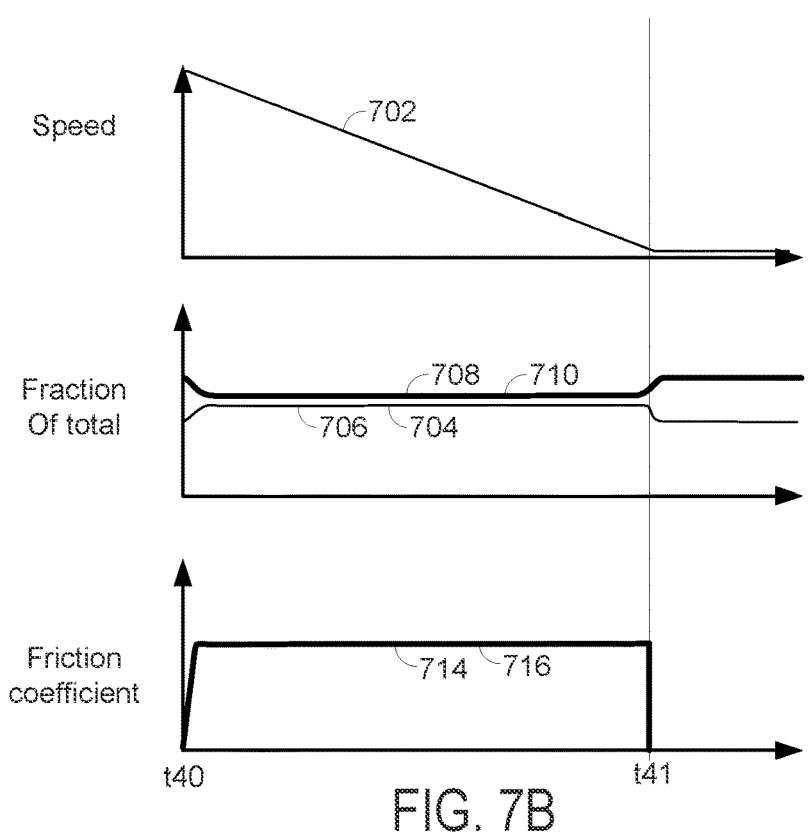

Referring now to FIG. 7B, a prophetic vehicle braking sequence according to the method of FIG. 4 is shown. In this example, the vehicle is decelerated from 30 miles/hour to 0 miles/hour when a maximum coefficient of friction between the wheel's tire and the road is μ=0.3 and braking is provided via front and rear electric machines. The vehicle at rest has a weight split of 45% front axle to 55% rear axle.

The first plot from the top of FIG. 7B is a plot of vehicle speed versus time. The vertical axis represents vehicle speed and vehicle speed increases in the direction of the vertical axis arrow. The horizontal axis represents time and time increases from the left side of the figure to the right side of the figure. Trace 702 represents vehicle speed.

The second plot from the top of FIG. 7B is a fraction of total metric being observed (e.g., vehicle weight over an axle or braking torque) versus time. The vertical axis represents fraction of the total metric being observed and the fraction of the total metric being observed increases in the direction of the vertical axis arrow. The horizontal axis represents time and time increases from the left side of the figure to the right side of the figure. Trace 704 represents the fraction of total braking torque that is provided via front friction brakes. Trace 706 represents a fraction of vehicle weight that is supported via the front axle. In this example, trace 704 and trace 706 overlap at all times so only a single trace is visible. Trace 708 represents a fraction of vehicle weight that is supported via the rear axle. Trace 710 represents the fraction of total braking torque that is provided via the rear friction brakes. In this example, trace 708 and trace 710 overlap at all times so only a single trace is visible.

The third plot from the top of FIG. 7B is a plot of friction coefficient between a road surface and the tires of the vehicle versus time. The vertical axis represents the friction coefficient between a road surface and the tires of the vehicle. The horizontal axis represents time and time increases from the left side of the figure to the right side of the figure. Trace 712 represents the maximum coefficient of friction between the tire and the road. Trace 714 represents the coefficient of friction between the front tires and the road. Trace 716 represents the coefficient of friction between the rear tires and the road. In this example, trace 714 and trace 716 overlap at all times so only a single trace is visible.

At time t40, the breaking request is asserted (not shown) and the friction brakes are applied (not shown). The fraction of a total vehicle weight that is supported by the front axle begins to increase and the fraction of total braking torque that is provided via front electric machine increases at a same rate. The fraction of the total vehicle weight that is supported via the rear axle begins to decrease and the fraction of total braking torque that is provided via the rear electric machine decreases at a same rate as the vehicle's suspension complies in response to the vehicle braking. The vehicle begins decelerating and the friction coefficient between the front tires and the road increases up to a level that is less than the maximum coefficient of friction between the tires and the road shortly after time t40. The friction coefficient between the rear tires and the road increases at a same rate as the friction coefficient between the front tires and the road increase.

Between time t40 and time t41, the fraction of total vehicle weight supported via the front axle levels off at a higher value than it started at time t40. The fraction of torque provided to the front wheels via the front electric machine levels off at a same percentage as the fraction of total weight supported by the front axle. The fraction of torque provided to the rear wheels via the rear electric machine levels off at a same percentage as the fraction of total weight supported by the rear axle. Similarly, the friction coefficient between the front tires and the road levels off at a higher value than it started at time t40. The friction coefficient between the rear tires and the road levels off at a same value as the friction coefficient between the front tires and the road. The vehicle continues to decelerate.

At time t41, the vehicle comes to a full stop and the brake pedal is released (not shown). The fraction of total vehicle weight supported via the front axle levels falls to its original value where it started at time t40. The fraction of total vehicle weight supported via the rear axle increased to the level of its original value where it started at time t40. The friction coefficient between the front tires and the road falls to zero when the vehicle stops. The friction coefficient between the rear tires and the road falls to zero when the vehicle stops.

In this way, two electric machines are controlled to provide a torque split or ratio between the front axle and the rear axle that matches the weight split or ratio between the front axle and the rear axle when the vehicle includes an additional load. This may allow the rear tires to provide additional braking torque so that wheel slip of the front axle and wheel slip of the rear axle may be avoided.

Referring now to FIG. 8A, an example chassis suspension 810 for vehicle 121 or a similar vehicle is shown. Tire 812 is mounted to a wheel (not shown) and the wheel is mounted to hub 808. Hub 808 is mechanically coupled to lower control arm 819 and upper control arm 820. Upper control arm 820 and lower control arm 819 may pivot about chassis support 802, which may be part of the vehicle's body. Spring 815 is coupled to chassis support 802 and lower control arm 819 such that spring 815 supports chassis support 802. Hub 808, upper control arm 820, and lower control arm 819 are unsprung since they are not supported by spring 815 and they move according to a surface of the road the vehicle is traveling on. A damper (not shown) may accompany spring 815 to provide a second order system. Front suspension height sensor 182 may sense a height of suspension 810.

FIG. 8B shows another example chassis suspension 850 for vehicle 121 or a similar vehicle. Tire 812 is mounted to a wheel (not shown) and the wheel is mounted to hub 857. Hub 857 is mechanically coupled to rear axle 122. Spring 851 is coupled to chassis 855 and rear axle 122. Hub 857 and rear axle 122 are unsprung since they are not supported by spring 851 and they move according to a surface of the road the vehicle is traveling on. A damper (not shown) may accompany spring 851 to provide a second order system. Rear suspension height sensor 181 may sense a height of suspension 850.

Suspension height sensors 181 and 182 may be configured as rotary or linear potentiometers, laser distance measuring devices, ultrasonic ride height sensors, or other known vehicle suspension or ride height sensors and output of these sensors may be indicative of a normal load that is applied to an axle. Further, in some examples, a load cell coupled to a wheel hub, chassis member, or suspension member may sense the normal load that is applied to a front or rear axle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for braking a vehicle, comprising:
adjusting an amount of braking torque applied to a front axle via a first electric machine and adjusting an amount of braking torque applied to a rear axle via a second electric machine according to a low pass filtered output of a sensor that is indicative of front axle normal load and a low pass filtered output of a sensor that is indicative of rear axle normal load in response to a braking request, where the low pass filtered output of the sensor that is indicative of front axle normal load is filtered via a first low pass filter, the first low pass filter including a cut-off frequency that is less than five hertz, where the amount of braking torque applied to the front axle is based on a ratio of a normal force on the front axle to a sum of the normal force on the front axle plus a normal force on the rear axle.

2. The method of claim 1, further comprising adjusting a relationship between the output of the sensor that is indicative of a front axle normal load and a front axle normal load in response to front wheel slip.

3. The method of claim 1, where the amount of braking torque applied to the rear axle is based on a ratio of a normal force on the rear axle to a sum of the normal force on the rear axle plus a normal force on the front axle.

4. The method of claim 1, where the low pass filtered output of the sensor that is indicative of rear axle normal load is filtered via a second low pass filter, the second low pass filter including a cut-off frequency that is less than five hertz.

5. The method of claim 1, where the braking request is based on application of a brake pedal.

6. The method of claim 1, further comprising estimating a normal load applied to the front axle in response to the low pass filtered output of the sensor that is indicative of front axle normal load.

7. The method of claim 1, further comprising estimating a normal load applied to the rear axle in response to the low pass filtered output of the sensor that is indicative of rear axle normal load.

8. A vehicle system, comprising:
a first electric machine coupled to a front axle;
a second electric machine coupled to a rear axle;
a front sensor including a low pass filtered output that is indicative of a front axle normal load;
a rear sensor including a low pass filtered output that is indicative of a rear axle normal load;
where the low pass filtered output of the front sensor is filtered via a first low pass filter, the first low pass filter including a cut-off frequency that is less than five hertz; and
a controller including executable instructions stored in non-transitory memory to adjust an amount of braking torque applied to a front axle via the first electric machine and adjusting an amount of braking torque applied to a rear axle via the second electric machine according to an output of the front sensor and output of the rear sensor in response to a braking request
where the amount of braking torque applied to the front axle is based on a ratio of a normal force on the front axle to a sum of the normal force on the front axle plus a normal force on the rear axle.

9. The system of claim 8, further comprising additional instructions to adjust a relationship between the output of the front sensor and a normal load applied to the front axle in response to front wheel slip.

10. The system of claim 8, further comprising additional instructions to adjust a relationship between the output of the rear sensor and a normal load applied to the rear axle in response to rear wheel slip.

11. The system of claim 8, where the amount of braking torque applied to the rear axle is based on a ratio of a normal force on the rear axle to a sum of the normal force on the rear axle plus a normal force on the front axle.

12. The method of claim 1, further comprising adjusting an amount of braking torque applied to the front axle via front axle friction brakes.

13. The method of claim 12, further comprising adjusting an amount of braking torque applied to the rear axle via rear axle friction brakes.

14. The method of claim 13, where the amount of braking torque applied to the front axle via the friction brakes is a fixed proportion to the amount of braking torque applied to the rear axle via the rear axle friction brakes.

15. The method of claim 13, where the amount of braking torque applied to the front axle via the friction brakes is a fixed proportion to the amount of braking torque applied to the rear axle via the rear axle friction brakes.

* * * * *